Dec. 22, 1925.                                       1,566,815
G. W. BULLEY
MOLDED BOX WITH VENEER EXTERIOR AND METHOD OF PRODUCING THE SAME
Filed April 3, 1925
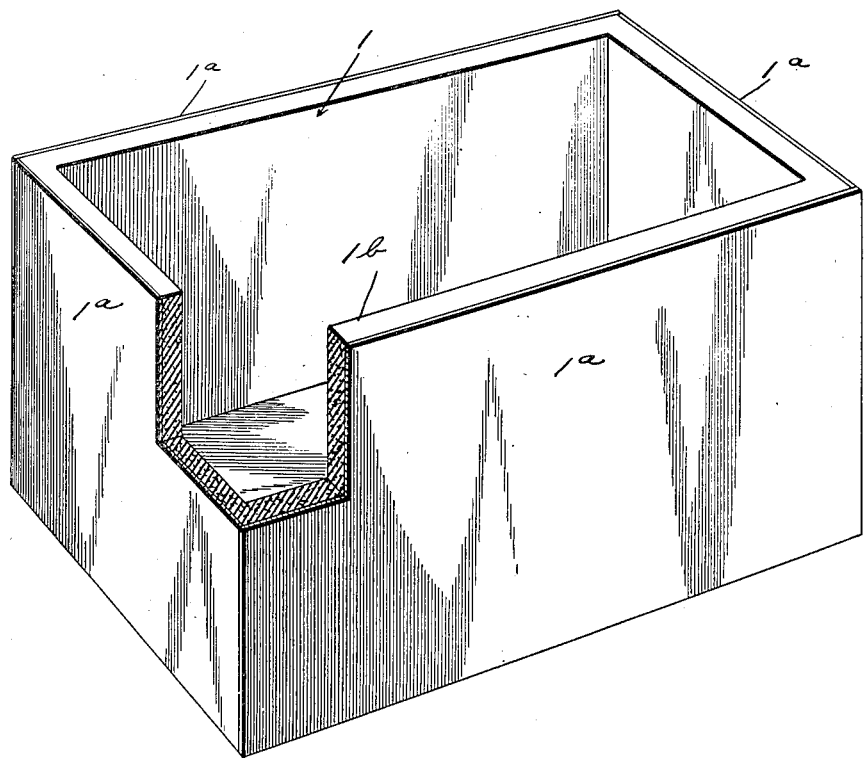
George W. Bulley Patented Dec. 22, 1925.

1,566,815

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

MOLDED BOX WITH VENEER EXTERIOR AND METHOD OF PRODUCING THE SAME.

Application filed April 3, 1925. Serial No. 20,476.

*To all whom it may concern:*

Be it known that I, GEORGE W. BULLEY, a citizen of the United States, and resident of Akron, in the county of Summit and State of Ohio, have invented certain new and useful Improvements in Molded Boxes with Veneer Exterior and Methods of Producing the Same, of which the following is a specification.

My present invention relates to a box, receptacle, or panel having a molded rubber base and a wood veneer exterior or finish.

The principal object of this invention is the provision of a box or panel which may be composed of a relatively cheap material, easily formed, with a wood veneer finish suitable to specific needs or tastes.

My invention comprises forming, in case of a box, a rough shape of unvulcanized rubber having a blowing agent therein, placing the same in a mold lined with thin pieces of veneer, placing inside the unvulcanized rubber box a core of substantially the shape of the box, and then vulcanizing. Under action of the heat, the usual reaction takes place, the blowing agent forcing the rubber against the veneer so that it becomes an integral part of the box itself.

The invention further consists in the novel combination and arrangement of parts herein described.

To enable the invention to be better understood, I have appended hereto a sheet of drawings, in which—

The figure shows an elevation of a box, partly broken away, it being understood that this is merely representative of any desired form of article.

A detailed method of producing such an article is as follows:—

A mold having the shape of the outside of the box or cabinet which I wish to form, is provided with a cover having a depending core attached thereto designed to form the inside of the cabinet box. Pieces of veneer which have previously received a coat of stain and one or more coats of a phenolic condensation product, and which have been allowed to dry, are cut to the proper shape and size to fit exactly the walls of the mold. These pieces of veneer are laid in place in the mold in their respective positions. A piece of hard rubber compound containing a blowing agent is formed into the shape of a box. This can be done by cutting pieces of this material and joining them together by seaming. This unvulcanized rubber box is so made that its interior dimensions are slightly larger than the core of the mold and its outside dimensions are slightly smaller than the dimensions of the mold with the veneer placed thereon. This unvulcanized rubber box is slid into place in the mold without disturbing the position of the pieces of veneer; the core is then placed in position and the mold is fastened together either by bolting or by being placed in a hydraulic press. The metal core conducts heat from the press to the surface of the uncured rubber and due to the fact that the rubber contains a blowing agent, it expands and forces the veneer against the surfaces of the mold.

The process of vulcanization is the same, of course, as that practiced on similar hard rubber articles, the mold being removed from the vulcanizer and cooled and the article is afterwards removed.

It will be apparent that a box, or panel or slab produced as above, may have a variety of uses and designs, as no limit is placed upon the various types of veneer which may be utilized.

In the drawing, the numeral 1 designates the box, 1ª the wood veneer, and 1ᵇ the cellular rubber lining or body.

It will be noticed that the veneer layers have their edges abutting so that the entire exterior of the box has a wood finish, (though such veneer may be omitted from the bottom as unnecessary), and the veneers are held in place in juxtaposition at their edges solely by the vulcanized lining or body. The resulting article has an attractive highly finished wood exterior surface, while at the same time it is practically a unitary article, the parts being homogeneously united and free from any metallic or like securing means.

As a mold and core of the form customarily used in molding hard rubber receptacles may be used to produce the article in the manner above described, I have deemed it unnecessary to show the same herein.

Having thus described my invention, what I claim is:—

1. A composite article composed of a surface layer of wood impregnated with a phenolic condensation product and a body of cellular hard rubber united by vulcanization.

2. A method of making a veneered article, comprising confining together a strip of wood impregnated with a phenolic condensation product and a material expansible under the action of heat, and applying heat thereto.

3. A method of making a veneered article, comprising impregnating a wood strip with a phenolic condensation product, confining said strip in a mold with a material expansible under the action of heat, and applying heat to said mold.

4. A veneered article having a cellular hard rubber base vulcanized to a strip of wood veneer.

5. A veneered article having a cellular hard rubber base and an exterior surface of wood veneer impregnated with a phenolic condensation product.

In testimony whereof, I affix my signature.

GEORGE W. BULLEY.